Figure 1:
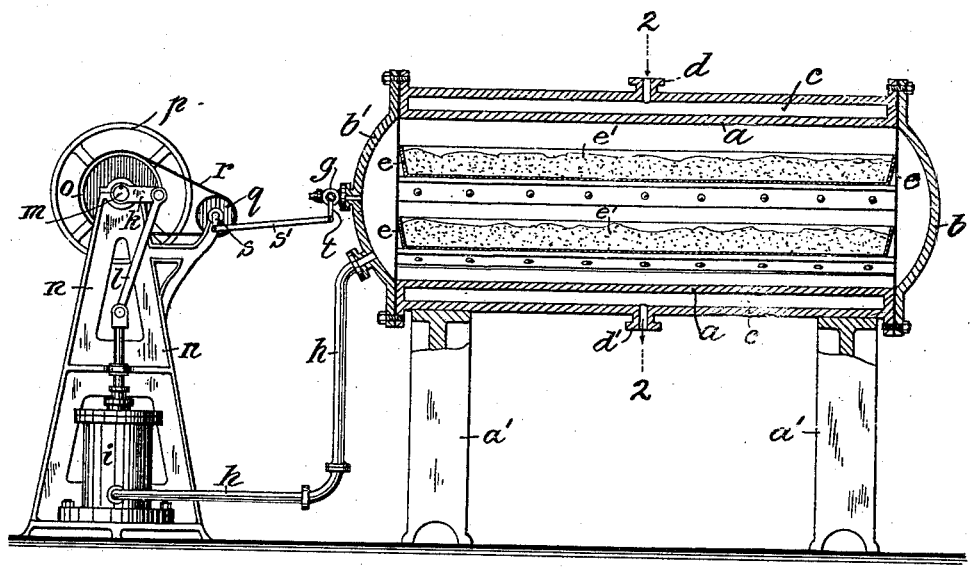

No. 688,711. Patented Dec. 10, 1901.
G. AMTHOR.
PROCESS OF DRYING FRESH GLUTEN.
(Application filed Feb. 12, 1901.)

(No Model.)

WITNESSES:
Joseph H. Niles.
George B. Geibel

INVENTOR
Gustav Amthor
BY
ATTORNEYS.

THE NORRIS PETERS CO., PHOTO-LITHO., WASHINGTON, D. C.

UNITED STATES PATENT OFFICE.

GUSTAV AMTHOR, OF HALLE-ON-THE-SAALE, GERMANY.

PROCESS OF DRYING FRESH GLUTEN.

SPECIFICATION forming part of Letters Patent No. 688,711, dated December 10, 1901.

Application filed February 12, 1901. Serial No. 47,000. (No specimens.)

*To all whom it may concern:*

Be it known that I, GUSTAV AMTHOR, a subject of the Emperor of Germany, residing at Halle-on-the-Saale, in the Kingdom of Prussia and Empire of Germany, have invented certain new and useful Improvements in Processes of Drying Gluten, of which the following is a specification.

A simple and unobjectionable process for converting fresh gluten into a stable and portable form without injury to its valuable properties or its chemical constitution, such as would be caused, for instance, by the influence of heat, is not known at the present time, although the solution of this problem would greatly extend the industrial use of gluten, which, as is well known, has a very high nutritive value. A process recently proposed involves freezing the gluten; but this would be very troublesome and in the summer it could not be carried on with large quantities without an expensive plant.

The present invention relates to a simple process for increasing the chemical stability of fresh gluten which has been relieved of starch by washing, so that the gluten will not lose its valuable properties and will not suffer from long transportation.

Attempts to extract the water from the tough and moist gluten which has been relieved of starch by treating the gluten in a vacuum at temperatures which are not high enough for causing the gluten to bake have always failed owing to the enormous increase of volume of the mass which is produced by a reduction of atmospheric pressure, the mass expanding to such an extent that comparatively small quantities of gluten would require very large apparatus for their treatment. This defect, which renders the desiccation of the tough gluten in a vacuum commercially impracticable, may, however, be avoided by modifying the treatment at the beginning—that is to say, by drawing air out of the apparatus, allowing it to reënter, and repeating this treatment in rapid succession, so as to cause the quantity of air in the vacuum apparatus or the degree of vacuum to fluctuate. The result is a correspondingly rapid alternate increase and reduction of the volume of the gluten, after which it will gradually—*i. e.*, within a quarter of an hour—assume a state of rest, so that the very objectionable increase of volume will not occur. If the vacuum is afterward gradually increased, on the contrary, the mass will yield its water without materially increasing in volume. The most advantageous temperature of working is about 30° centigrade.

Figure 2:
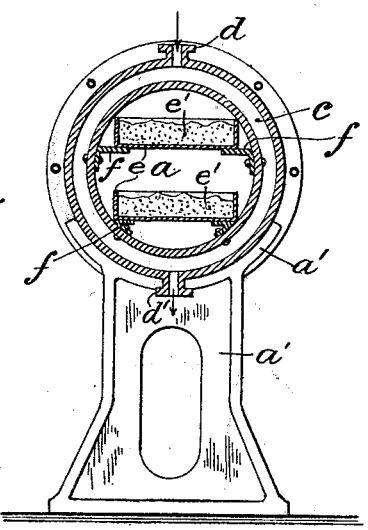

In the accompanying drawings, Figure 1 is a side elevation, partly in a vertical longitudinal section, through an apparatus suitable for carrying out my improved process; and Fig. 2 is a cross-section through the tank on line 2 2, Fig. 1.

Similar letters of reference indicate corresponding parts.

Referring to the drawings, $a$ indicates an air-tight cylindrical tank which is mounted on suitable supports $a'$ and provided with removable covers $b\ b'$ and an annular chamber $c$, concentrically surrounding its walls. The said chamber has an inlet-pipe $d$ and an outlet $d'$ for permitting free circulation of hot water through said chamber, which provides means for maintaining an even temperature of about 30° centigrade within said tank. Upon rails $ff$ provided within the tank trays $e\ e$ are placed, containing the gluten to be dried, as shown at $e'$, the cover $b$ serving as a door for charging the apparatus. An air-inlet valve $g$ is provided on the cover $b'$, and the pipe $h$ leads from said cover to an air-pump $i$. The latter is operated by a crank $k$ and connecting-rod $l$, the crank being rotated by an axle $m$ in a suitable frame, such as $n$, and having a pulley $o$ and a fly-wheel $p$. Power is transmitted to the said axle in any convenient manner and is imparted to a smaller pulley $q$ by means of a belt $r$, which pulley rotates a crank $s$, and the latter by a connecting-rod $s'$ imparts reciprocating motion to the lever $t$ on the valve $g$, thereby alternately and rapidly opening and closing the said air-inlet valve $g$, while the air-pump operates to create a vacuum within the tank. When the gluten assumes a state of rest, further rotation of the pulley $q$ is prevented by removing the belt or in any other convenient manner, so that the valve $g$ may be closed and the vacuum gradually increased for the purpose above described.

The dry gluten obtained as described and which may afterward be relieved of any fat contained in it by treatment with suitable solvents is white in color. It may be kept in good condition for an indefinite length of time and can be easily pulverized. The great advantage of this pulverized gluten in comparison with tough and moist masses of gluten as regards suitability for transportation is apparent. The said masses contain about sixty-eight per cent. of water, which constitutes a useless ballast, and the moist gluten is unstable, while dry gluten obtained by the above-described process remains unaltered after long storage.

Having thus described my invention, I claim as new and desire to secure by Letters Patent—

1. The process herein described of drying fresh gluten, which consists in placing the gluten in moist condition in a vacuum, rapidly and successively increasing and decreasing the degree of vacuum for a predetermined time, and finally gradually increasing the vacuum for expelling the remaining moisture from the gluten, substantially as set forth.

2. The process herein described of drying fresh gluten, which consists in placing the gluten, in a moist state, within an air-tight tank, subjecting said gluten to a rapidly-alternating increasing and decreasing vacuum, and finally completing the vacuum, said steps being carried on under an approximately even given temperature, substantially as set forth.

In testimony that I claim the foregoing as my invention I have signed my name in presence of two subscribing witnesses.

GUSTAV AMTHOR.

Witnesses:
MAX GROSSMANN,
RUDOLPH FRICKE.